United States Patent [19]
Low et al.

[11] Patent Number: 5,871,131
[45] Date of Patent: *Feb. 16, 1999

[54] BICYCLE TRANSPORTATION RACK

[76] Inventors: Michael C. Low, 1646 Spring La., Holladay, Utah 84117; Rodney C. Low, 2175 N. 950 E., Logan, Utah 84341

[ * ] Notice: This patent issued on a continued prosecution application filed under 37 CFR 1.53(d), and is subject to the twenty year patent term provisions of 35 U.S.C. 154(a)(2).

[21] Appl. No.: 722,300

[22] Filed: Sep. 30, 1996

Related U.S. Application Data

[63] Continuation-in-part of Ser. No. 505,563, Jul. 21, 1995, abandoned.

[51] Int. Cl.$^6$ ........................................ B60R 9/00
[52] U.S. Cl. .................. 224/537; 224/510; 224/519; 224/531; 224/554; 224/571; 211/17; 211/18
[58] Field of Search .................... 224/924, 531, 224/532, 537, 488, 495, 501, 510, 518, 519, 548, 552, 554, 571; 211/17, 18, 22

[56] References Cited

U.S. PATENT DOCUMENTS

| | | |
|---|---|---|
| 3,848,784 | 11/1974 | Shimano et al. . |
| 3,891,132 | 6/1975 | Chandler .................................. 224/924 |
| 4,461,410 | 7/1984 | Tartaglia . |
| 4,676,414 | 6/1987 | Deguevara . |
| 4,856,686 | 8/1989 | Workentine .............................. 224/924 |
| 5,232,134 | 8/1993 | Allen . |
| 5,238,125 | 8/1993 | Smith ........................................ 211/22 |
| 5,269,446 | 12/1993 | Biehn . |
| 5,476,203 | 12/1995 | Fletcher .................................... 224/924 |
| 5,497,927 | 3/1996 | Peterson .................................. 224/924 |
| 5,526,971 | 6/1996 | Despain . |
| 5,579,972 | 12/1996 | Despain .................................. 224/924 |

FOREIGN PATENT DOCUMENTS

| | | | |
|---|---|---|---|
| 415343 | 9/1910 | France ....................................... 211/22 |
| 586114 | 12/1958 | Italy ........................................... 211/22 |
| 1271776 | 11/1986 | U.S.S.R. .................................. 224/924 |
| 2258200 | 2/1993 | United Kingdom .................... 224/924 |

*Primary Examiner*—Charles R. Eloshway
*Attorney, Agent, or Firm*—Trask, Britt & Rossa

[57] ABSTRACT

A bicycle rack for supporting bicycles in an upward standing position at the back end of a vehicle with the bicycles standing in a substantially vertical position angled horizontally at the back end of the vehicle. The trailer hitch sleeve mounted bicycle rack supports bicycles, each in an upward standing position on a center support post. The bicycle rack includes a base member (22) of which the tongue portion (23) slides into a trailer hitch sleeve (11). An adjustable sliding member (21) slides onto the base member (22). A vertical support post (20) is affixed to the sliding member (22). A series of horizontal trays (31) angled from the base of the vertical support post (20), and a series of bicycle front fork mounts (32) at the top of the vertical support post (20). The horizontal trays (31) receive a portion of the rear wheel of a bicycle so as to cradle the wheel and support the bicycle. Bicycles stand upwardly from the rear wheel support trays (31) angled from the base of the vertical support post (20) at the rear of the vehicle (12).

7 Claims, 8 Drawing Sheets

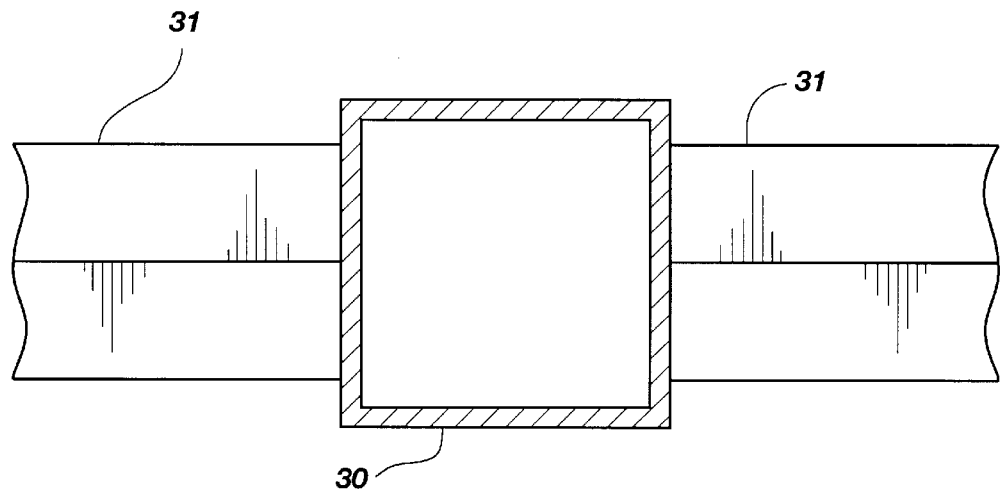
Fig. 8
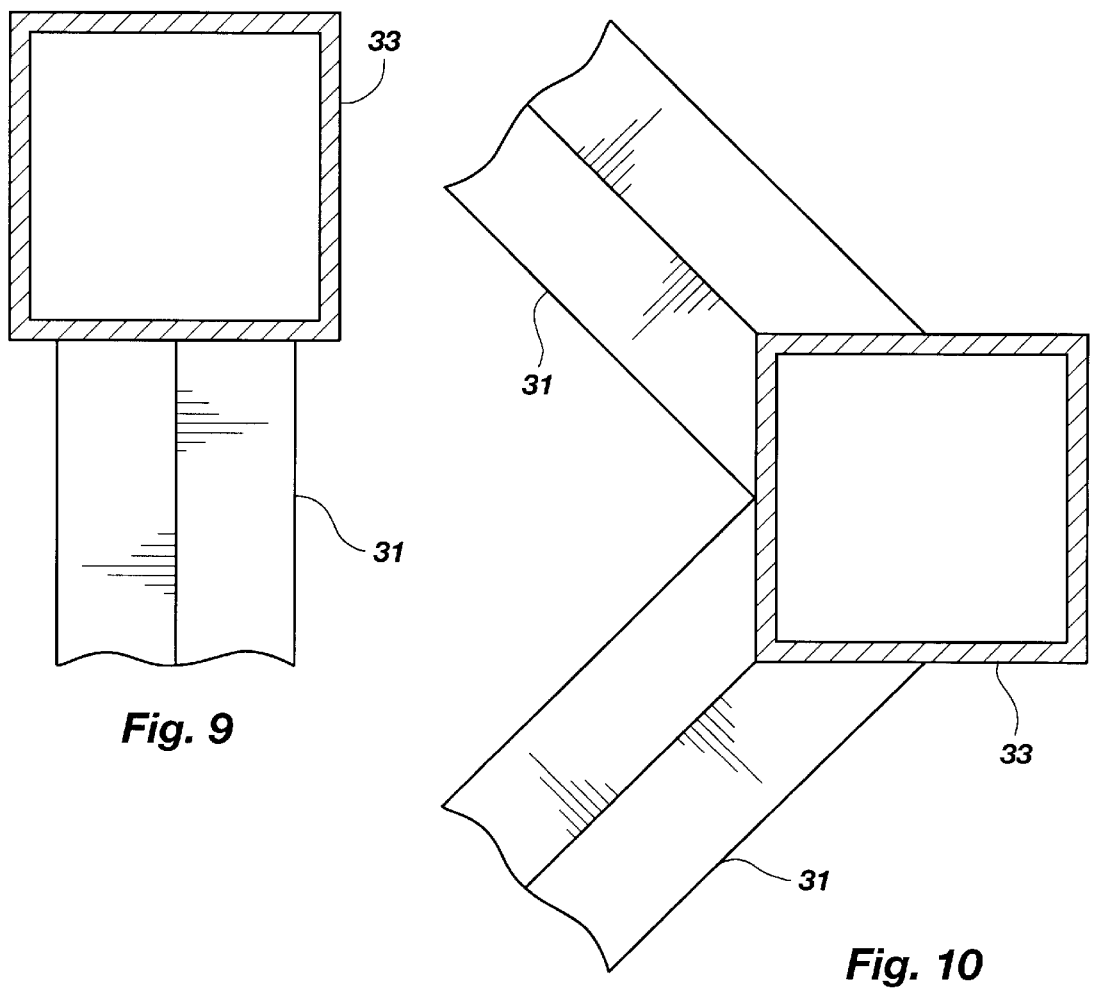
Fig. 9
Fig. 10

BICYCLE TRANSPORTATION RACK

RELATED APPLICATIONS

This application is a continuation in part of U.S. patent application Ser. No. 08/505,563 filed on Jul. 21, 1995, now abandoned.

TECHNICAL FIELD

This invention generally relates to the transport of bicycles, and specifically to bicycle racks for automobiles and sport/recreational vehicles.

BACKGROUND

The sport of bicycling is a very popular and growing sport. The transportation of bicycles from home to favorite riding areas is very important, and because bicycles have become so technically advanced in recent years, the method of transporting them is also very important. There are a number of different bicycle racks on the market at the present time and new ones appear frequently. The two most popular ways of mounting a bicycle rack to a vehicle are to the roof or to the rear end of the vehicle.

U.S. Pat. No. 4,461,410 to Tartaglia (Jul. 24, 1984) discloses a rear mount bicycle rack secured through a ball attachment aperture in a trailer hitch. U.S. Pat. No. 4,676,414 to Deguevara (Jun. 30, 1987) discloses a rear mount bicycle rack which is inserted into a tubular trailer hitch receiver, a common method of mounting modern rear mount bicycle racks. Such racks generally hang the bicycles from the main crossbar of the frame perpendicular to the vehicle.

Because the bicycles hang however, they often swing and cause damage to both the bicycle and the vehicle. It is also very difficult to secure the bicycle to the rack, and people often resort to "bungee cords" or other methods to adhere the bicycles securely. When rear mounted racks are in place on the vehicle, they can limit or exclude access to the rear door or trunk of the vehicle, and removing and replacing the rack frequently in order to gain access to the trunk may cause damage to the paint and exterior of the vehicle.

With the advent of the "quick release" bicycle hub, roof mounted racks have become quite popular. U.S. Pat. No. 3,848,784 to Shimano et al. (Nov. 19, 1974) discloses a roof mount rack, the use of which involves removal of the front wheel of the bicycle, and the slotted front forks of the bicycle frame are clamped to the rack by means of a quick release bicycle hub. The bicycle frame then stands upright on the vehicle's roof.

Although roof mounted racks are more likely to secure bicycles to a vehicle than a rear mount rack, they present other problems to the cyclist and his or her vehicle. In order to mount a bicycle to a roof mounted rack, one must lift the bicycle to the top of the vehicle and then attach it to the rack. Such an action can be very difficult with one's arms extended; trying to balance and hold the weight of the bicycle. If one is trying to put more than one bicycle on the roof mounted rack, he or she must be able to reach across to the center of the vehicle roof, which is even more difficult and awkward. Many vans and recreational vehicles are too high to reach without a stepladder or some other type of step. When bicycles are mounted on the roof mounted racks, it increases the vehicle's height making it difficult to enter a garage or carport.

Roof mounted racks are also not intended for use on convertibles or recreational vehicles without tops. Installing roof mounted racks on the vehicle is also very difficult, often requiring the expertise of a factory-trained technician. Most roof mounted racks are not easily removed from the vehicle and are therefore left on the vehicle in a semi-permanent state, susceptible to vandalism and theft. During removal, a risk exists for scratches or other damage to the vehicle.

Another method of mounting bicycles to vehicles is to mount them vertically on the back. For example, U.S. Pat. No. 5,269,446 to Biehn (Dec. 14, 1993) discloses such a device. However such devices have apparently enjoyed limited success since they are either too difficult to attach to the vehicle or are too large and awkward.

It is apparent that a need exists for a new and improved method of transporting bicycles on a vehicle.

DISCLOSURE OF THE INVENTION

The invention includes a bicycle rack for supporting bicycles in an upward, standing position at the rear end of a vehicle, with the bicycles mounted to the rack in a substantially vertical position at the rear end of the vehicle (e.g. to a trailer hitch sleeve). The thus mounted bicycle rack supports bicycles, each in an upward standing position, radially about a center support post. The bicycle rack comprises a base member having a tongue portion which affixes to the rear of the vehicle, e.g. by sliding into a trailer hitch sleeve. An adjustable sliding member slides onto the base member. A vertical support post is affixed to the sliding member. A series of horizontal trays is angled radially about the base of the vertical support post, and a series of bicycle front fork mounts is correspondingly mounted about the top of the vertical support post. The horizontal trays receive a portion of the rear wheel of a bicycle so as to cradle the wheel and support the bicycle. Bicycles stand upwardly from the rear wheel support trays angled from the base of the vertical support post at the rear of the vehicle.

The bicycle transportation rack can be used to transport bicycles easily and conveniently, can carry a large quantity of bicycles, can be easily attached to and removed from a vehicle, and is less likely to cause damage to vehicles than certain other prior art bicycle racks. Furthermore, the bicycle rack described herein has the additional advantages that: it does not increase the height of a vehicle to the point that it cannot enter a garage or carport; it does not require one to lift the bicycle over one's head; it generally allows for access to the rear of a vehicle without removing the bicycles from the rack or the rack from the vehicle; and it is adjustable and adaptable for different vehicles.

BRIEF DESCRIPTION OF THE FIGURES

In the drawings, which depict presently preferred embodiments of the invention and in which like reference numerals refer to like parts in different views:

FIG. 8 shows a top view of a tray support assembly with two rear wheel support trays.

FIG. 9 shows a top view of a tray support assembly with one rear wheel support tray.

FIG. 10 shows a top view of a tray support assembly with two rear wheel support trays.

BEST MODE OF THE INVENTION

Figure 1:
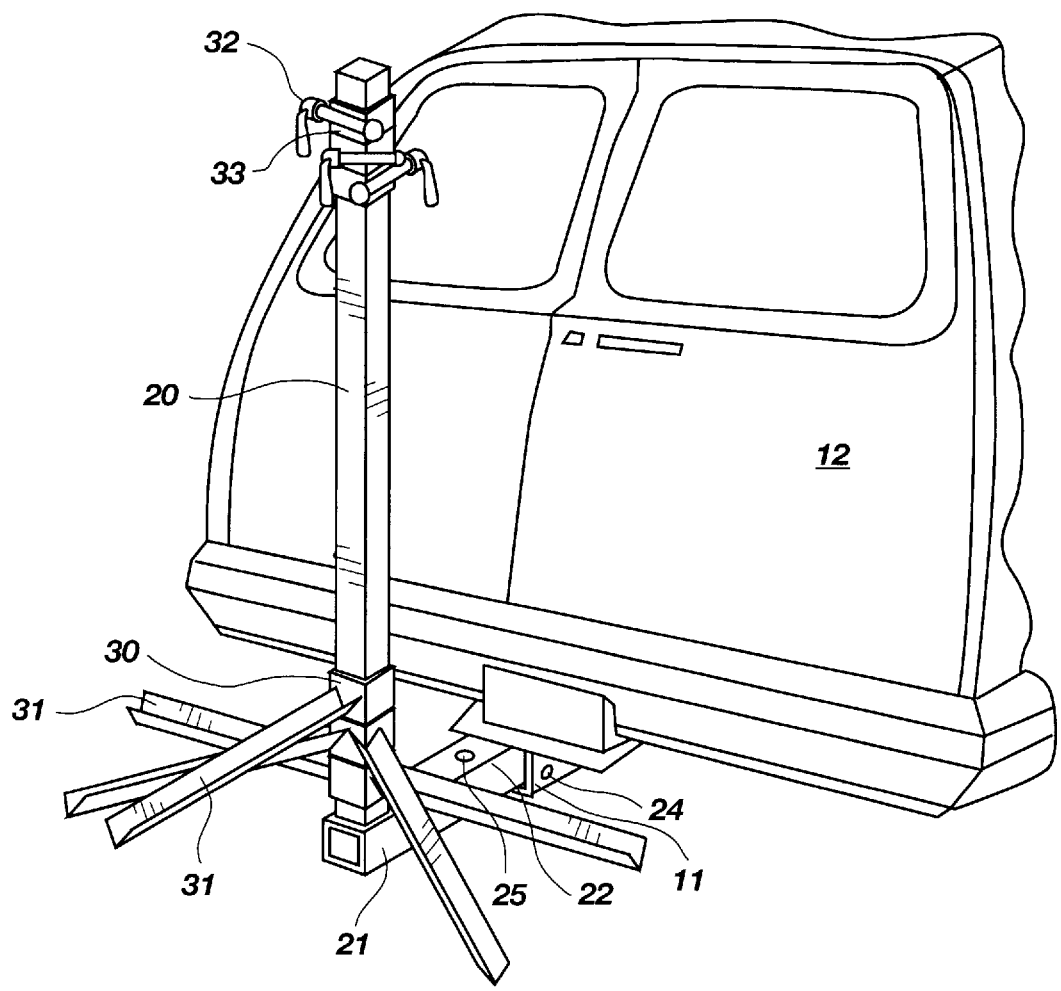
FIG. 1 shows a bicycle rack, according to the invention, attached to the rear of a vehicle with trays and attachments mounted.

With reference to the drawings, and in particular to FIG. 1 thereof, a new and improved quick release bicycle transportation rack embodying the principles and concepts of the present invention and generally designated by the reference numeral 10 is described in accordance with the present invention shown attached to the rear of a vehicle 12. The several embodiments of the rack 10 as shown in the drawings are similar, and like parts of each embodiment are identified with the same reference numeral. As used throughout the specification and claims, the word "vehicle" includes motor vehicles such as automobiles, as well as recreation vehicles including motor homes and sport utility vehicles.

Figure 2:
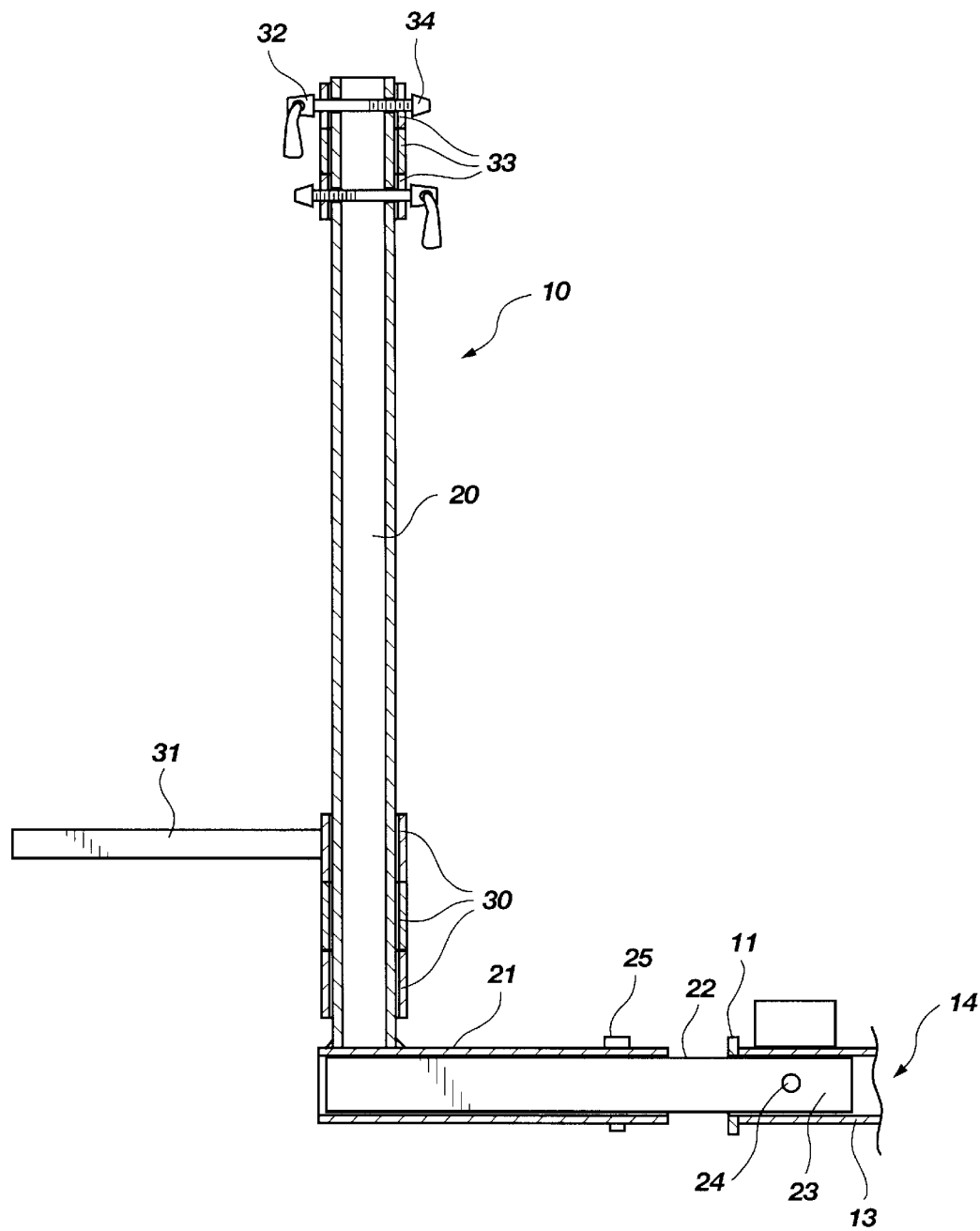
FIG. 2 shows a side view of the rack, with a cross-section of the base member as it attaches to a trailer hitch sleeve and the sliding member of the support post.

An especially preferred bicycle rack 10 is shown in FIG. 2, and includes a base member 22 extending longitudinally and rearwardly relative to the vehicle 12. It is comprised of material (e.g. steel or other metal) sized and shaped to be slidably received within the cavity 14 of a trailer hitch sleeve 11 affixed to the rear of the vehicle. Trailer hitch sleeves 11 are well known in the art, and are generally formed from planar walls 13 that define a longitudinal axial cavity 14 of square or rectangular cross section.

Other means for mounting the rack to the vehicle include a rear bumper mounting, welding or otherwise affixing (e.g. by screws, bolts or cables) the rack directly to the vehicle, the vehicle's frame, trunk lid, or rear door, and equivalent means.

Figure 3:
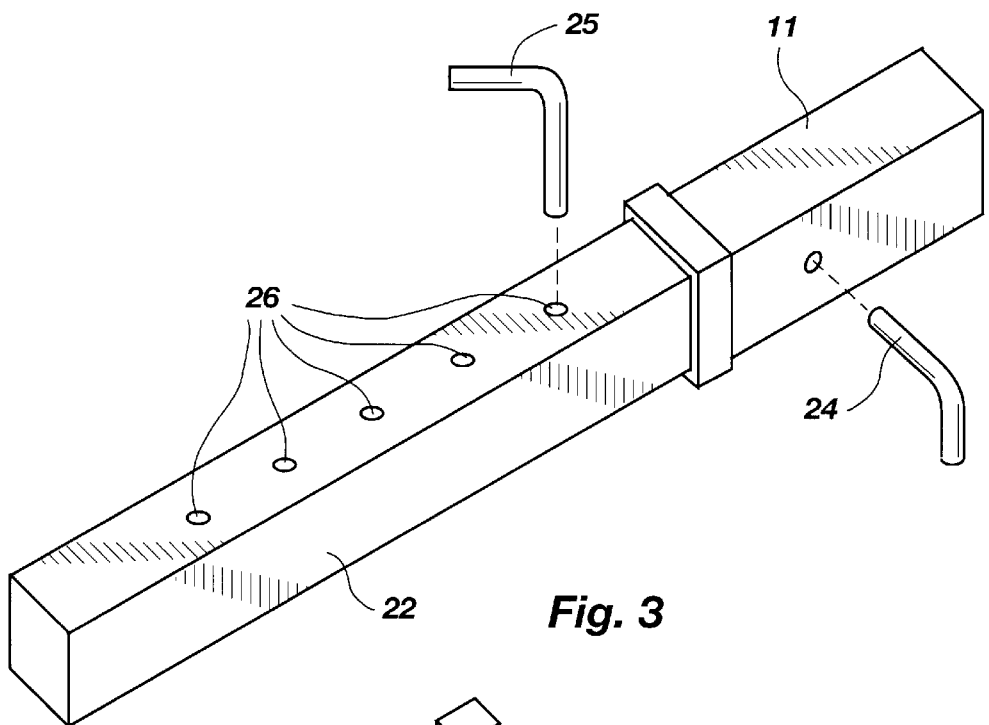
FIG. 3 shows the base member and how it attaches to the trailer hitch sleeve. It also shows the adjustment holes in the base member.
Figure 4:
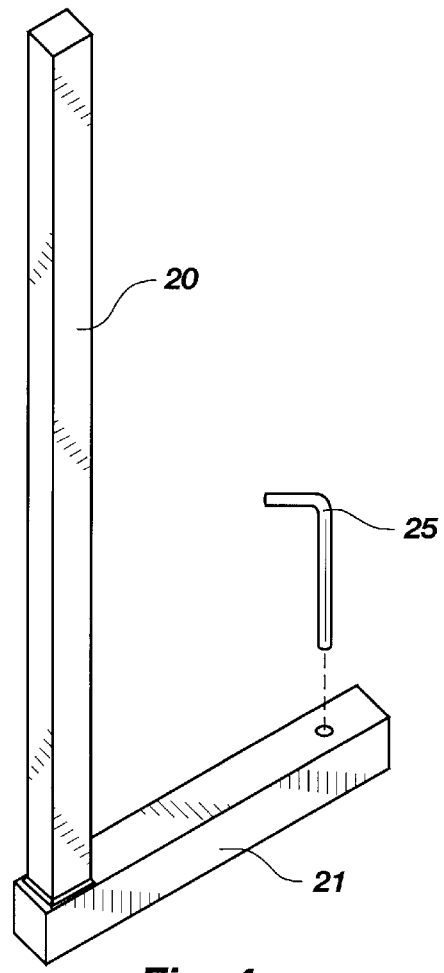
FIG. 4 shows the support post and the sliding member of the support post with the adjustment cross lock pin.

As best shown in FIG. 3 the depicted base member 22 may be formed of a pipe or tube having a generally square or rectangular cross-sectional shape. The length of the base member will typically be between about two and four feet. The tongue portion 23 of the base member 22 (FIG. 2) has an outer cross-sectional profile smaller than that of the profile of the trailer hitch cavity or sleeve 11 to facilitate the rapid installation and removal of the bicycle rack 10. A cross lock pin 24 projects transversely through the trailer hitch sleeve 11 and the tongue portion 23 to lock the base member 22 in engagement with the sleeve 11 (FIG. 3).

A vertical support post 20 as shown in FIG. 2, may be a single member affixed to the sliding member 21 which is sized and shaped to receive the base member 22. It has a length chosen to accommodate a plurality of bicycles as described herein, and will generally vary from four to seven feet. Generally the length of the support post (measured from the base member) will be three to eight inches longer than the length of a bicycle to be stored on the bicycle rack.

In an alternative embodiment (not shown), the vertical support post is affixed directly to the base member. In still another embodiment, the vertical support member consists of two portions, one portion of which is a top post portion with a sleeve on its bottom end sized to accommodate the bottom post portion which is affixed (e.g. by welds, screws, bolts or equivalent means) to either the base member or sliding member. A locking bolt may be used to secure the top and bottom portions together.

In the depicted embodiment, an adjustment cross lock pin 25 projects vertically through the sliding member 21 of the vertical support post 20 and proceeds through an adjustment hole 26 provided in the top plane of the base member 22 and locks the base member 22 to the sliding member 21. Additional adjustment holes 26 are provided in the base member 22 to allow the vertical support post 20 to be adjusted at various distances from the vehicle 12 as seen in FIG. 3. Tray supports 30 are of material sized and shaped to slidably receive the vertical support post 20. Wheel support trays 31 for rear bicycle wheels, are affixed to the tray supports 30.

Figure 5:
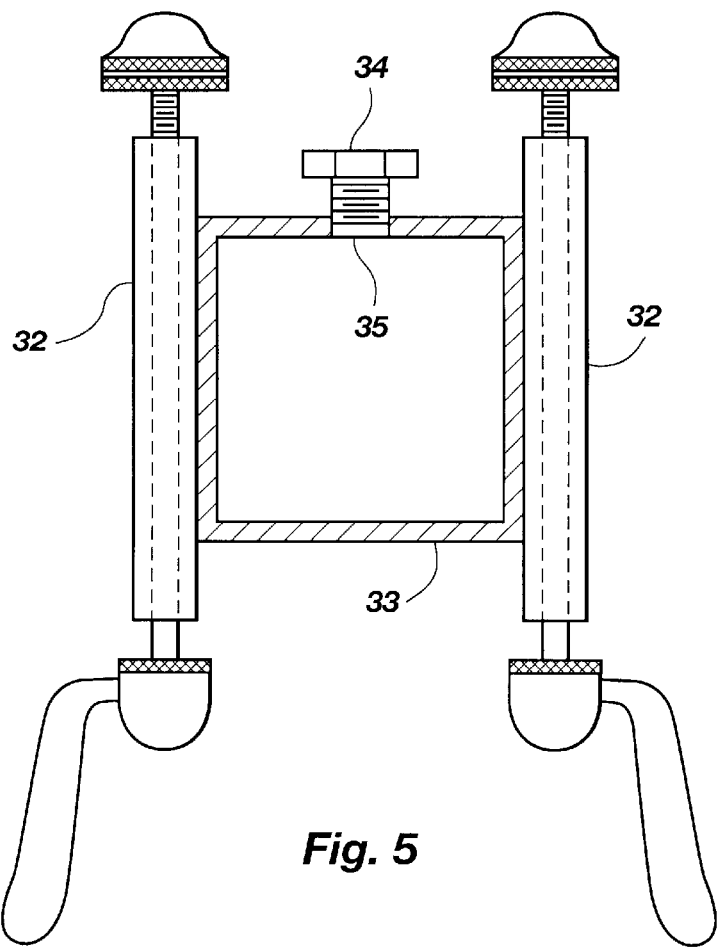
FIG. 5 depicts a top view of a fork mount support with two fork mounts and a lock bolt.
Figure 6:
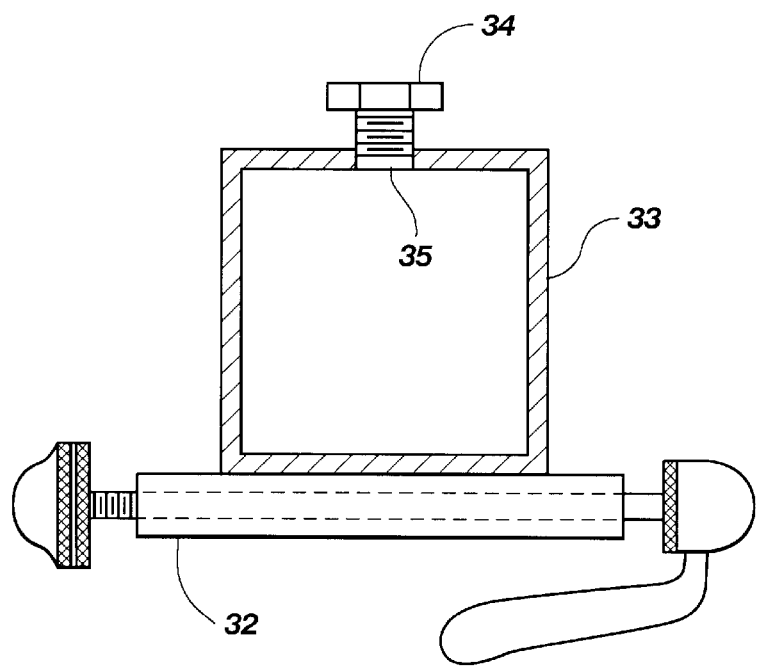
FIG. 6 depicts a top view of a fork mount support with one fork mount and a lock bolt.
Figure 7:
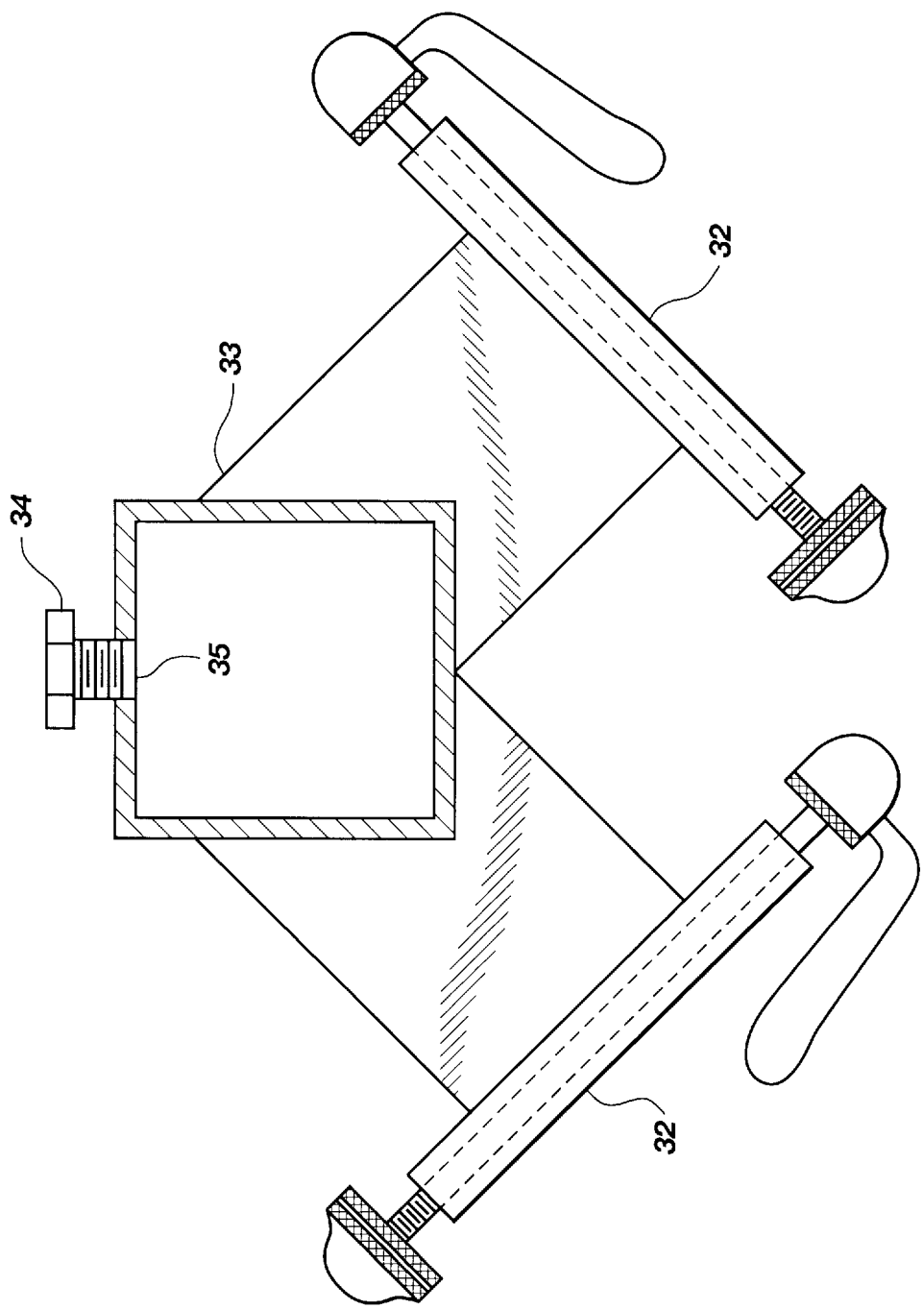
FIG. 7 depicts a top view of a fork mount support with two fork mounts angled diagonally with a lock bolt.

Tray supports 30 are slipped onto and stacked from the base of the vertical support post 20, with each tray support 30 having rear wheel support trays 31 extending outwardly at varying angles, as shown in FIG. 1. Front fork mounts 32 are affixed to the front fork mount supports 33 as shown in FIGS. 5–7. Front fork mounts 32 are well known in the art and need not be further described herein. Front fork mount supports 33 slide onto the top portion of the vertical support post 20 and are held in place by means of a lock bolt 34 which is threaded through a threaded hole 35 on the back side of the front fork mount support 33 as shown in FIGS. 5–7.

In FIG. 7, a front fork mount support supports two diagonal front fork mounts. In alternative embodiments, the structure can accommodate from one to four diagonal front fork mounts.

Figure 13:
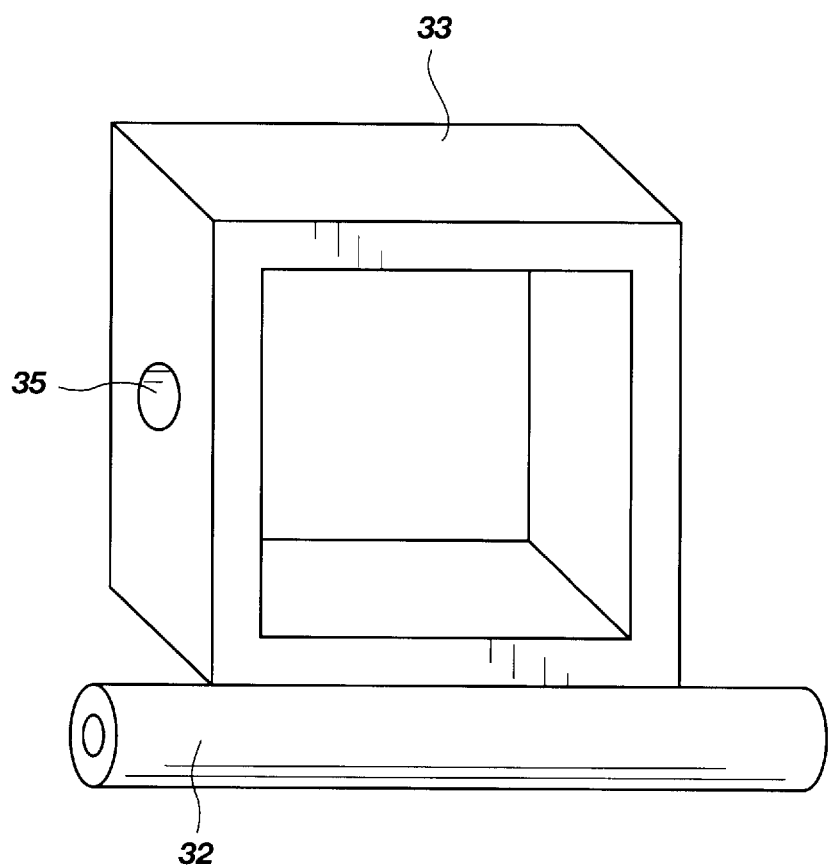
FIG. 13 depicts a top view of a fork mount support for use with the invention.

In another embodiment (FIG. 13), the front fork mount 32 may be placed on the bottom edge of the fork mount support 33 (e.g. by welding or forming the two together) so that two (2) fork mounts may be placed together, one right side-up, and the other upside down with both fork mounts at the same height on the vertical support. The fork mount support will preferably be of typical dimensions (e.g. one-half inch outer diameter, one-quarter inch inner diameter tubing, having a length of three to four inches).

Alternatively, instead of using traditional fork mounts, other means for mounting the front end of a bicycle to the vertical support post include cables, bolts, cords, and equivalent means.

Figure 12:
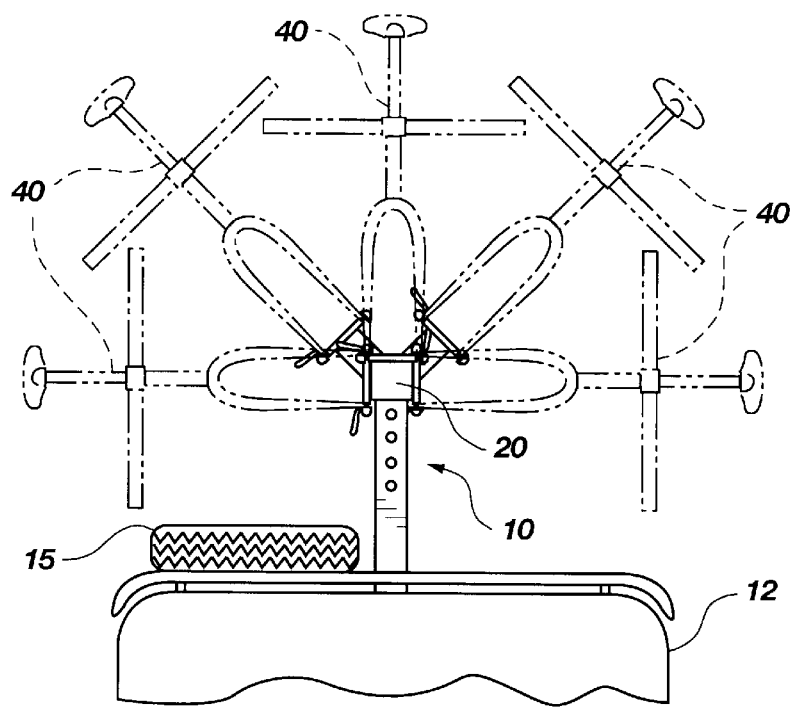
FIG. 12 shows a top view of the bicycle rack with five bicycles attached.

The manner of mounting the bicycle transportation rack to a vehicle is similar to that for racks presently in use which attach to a trailer hitch receiver. Specifically, one first inserts the base member 22 into a standard square tubular trailer hitch receiver 11 mounted onto the vehicle 12 and locks it with the cross lock pin 24 as shown in FIG. 3. One then mounts the rest of the rack 16 to the base member 22 by sliding the support post sliding member 21 onto the base member 22, and locks it by inserting the adjustment cross lock pin 25 through the sliding member 21 and into one of the adjustment holes 26 in the top of the base member 22. Adjustment of the distance between the vertical support post 20 and the vehicle 12 can be made by inserting the adjustment cross lock pin 25 into different holes 26 at different distances from the vehicle 12, thus allowing space for a spare tire 15 (or other cargo) mounted onto the back of the vehicle 12, as shown in FIG. 12. The adjustment cross lock pin 25 may also be removed while bicycles 40 are still on the rack 10, and the sliding member slipped back to allow access to the rear door or trunk of the vehicle 12.

Figure 11:
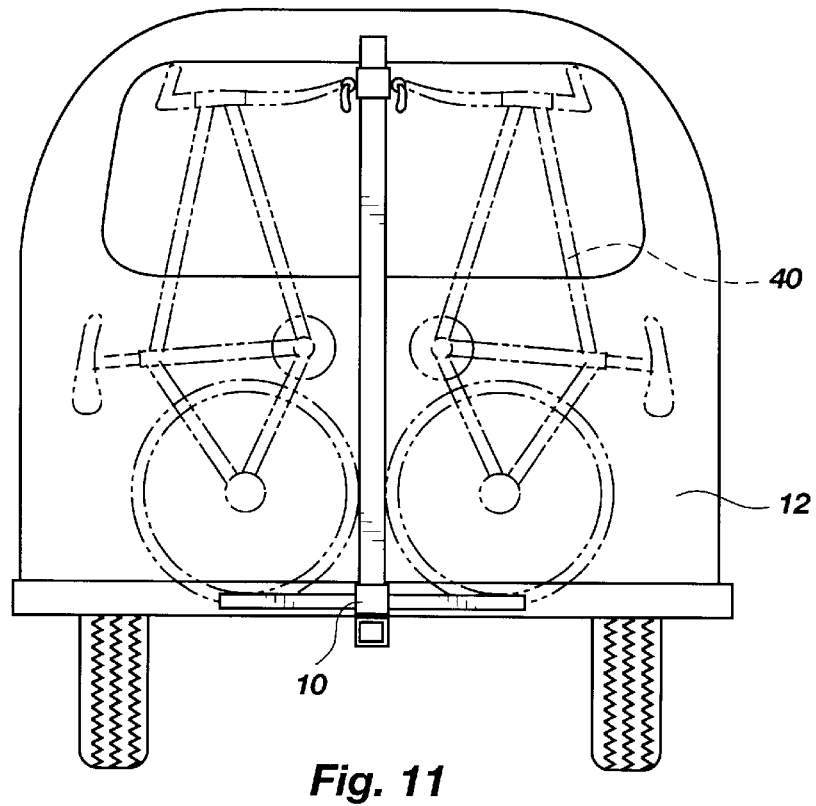
FIG. 11 shows a rear view of a vehicle with the bicycle rack attached and two bicycles shown in phantom.

Bicycles may be mounted onto the rack 10 by removing the front wheel of the bicycle and placing the back wheel of the bicycle in the rear wheel support tray 31 which extends from the vertical support post 20. The slotted front forks of the bicycle may then be clamped onto the front fork mount 32 that corresponds with the rear wheel support tray 31 in which the bicycle is mounted (FIG. 11). The front fork mount 32 may be adjusted to the desired height by sliding the front fork mount support 33 up or down on the vertical support post 20, and then secured in place by tightening the lock bolt 34 to the vertical support post 20. The bicycle is subsequently secured to the rack with the rear wheel support tray 31 holding the weight of the bicycle and the front fork mount securing it to the post.

As shown in FIG. 12, a plurality of wheel support trays 31 extend radially from the support post 20, corresponding to the number of bicycles (e.g. from one to eight bicycles) to be mounted to the rack 10. As shown in FIG. 12, in a horizontal plane with the post 20 being the center point, five wheel support trays are mounted at angles of 0°, 45°, 90°, 135°, and 180° to readily accommodate the bicycles. Of course with such radial mounting, three more bicycles could be accommodated if additional support trays and front wheel mounts were also placed radially at 225°, 270° and 315° about the post.

After being apprised of the devices according to the invention, methods of making them will become readily apparent to those of skill in the art. Most parts can be ready made from available metals (e.g. steel, aluminum, iron or alloys), or can be bought "off the rack".

Advantages of the bicycle transportation rack described herein include:

(a) the ability to conveniently carry one or more bicycles on a vehicle which is otherwise too tall to be adequate for (or has no capacity for) a roof-mounted rack;

(b) the ability to quickly and easily load and unload bicycles;

(c) the ability to easily and quickly mount and remove bicycles to and from a vehicle;

(d) the ability to be adjusted and adapted for use with a wide variety of vehicles;

(e) allowing for ready access to the rear of a vehicle without removing the bicycles or rack;

(f) minimalization of the amount of lifting of bicycles onto and off the rack;

(g) a durably and reliably constructed bicycle transportation rack; and (h) the ability to be easily and efficiently manufactured.

Although the invention has been described with regard to certain preferred embodiments, the scope of the invention is to be defined by the appended claims.

What is claimed is:

1. A bicycle rack for supporting a plurality of bicycles in a upward standing position at the rear of a vehicle having a rear and front end, wherein the bicycles are supported vertically, said bicycle rack comprising:

a base member having first and second ends;

a means for mounting the first end of said base member to the vehicle's rear end so that said base member extends rearwardly from the vehicle;

an elongate member having a vertical portion and means for associating said vertical portion to said base member's second end, said vertical portion having upper and lower ends, and a length greater than that of each of the bicycles, said bicycles lacking a front wheel, said vertical portion extending upwardly from the second end of the base member;

a series of trays, each tray sized and shaped to receive a respective rear wheel of the bicycles, said trays being stacked one atop another and extending radially in different horizontal planes from said vertical portion proximate said vertical portion's lower end; and means for releasably securing the upper end of said vertical portion to the respective front ends of the bicycles.

2. The bicycle rack of claim 1 wherein the means for releasably securing the upper end of said vertical portion to the respective front ends of the bicycles comprises at least one fork mount positioned at the upper end of said vertical portion.

3. The bicycle rack of claim 1 wherein the means for releasably securing the upper end of said vertical portion to the respective front ends of the bicycles comprises:

a plurality of clamping means affixed at different angles horizontally to the upper end of said vertical portion for securing front forks of the bicycles thereto.

4. A bicycle rack for supporting a plurality of bicycles in an upright and vertical position at a vehicle's rear end, said bicycle rack comprising:

an L-shaped support member having a base portion forming a base of the L-shaped member, and an elongate vertical portion joined generally perpendicularly thereto, said elongate vertical portion having a free end and a joining end which joining end joins with said base portion;

means for mounting said L-shaped support member to the vehicle's rear end so that said base portion of the L-shaped support member extends rearwardly from the vehicle, and said elongate vertical portion extends upwardly from the base portion;

a series of elongate trays each having a longitudinal axis, said elongate trays sized and shaped to receive a respective rear wheel of a bicycle, said trays being stacked one atop another and extending along their respective longitudinal axes radially in different horizontal planes from the joining end of said elongate vertical portion of the L-shaped support member; and means for releasably securing the front ends of the bicycles, said means for releasably securing the front ends of the bicycles placed on the free end of said elongate vertical portion.

5. The bicycle rack of claim 4 wherein the base portion and elongate vertical portion of the L-shaped member are separate pieces permanently joined to one another.

6. The bicycle rack of claim 4 wherein the elongate vertical portion is made of a single, unitary piece.

7. In a bicycle rack for supporting a plurality of bicycles in a upward standing position at the rear of a vehicle having a rear and front end, wherein the bicycles are supported vertically, said bicycle rack comprising:

a base member having first and second ends;

a means for mounting the first end of said base member to the vehicle's rear end so that said base member extends rearwardly from the vehicle;

an elongate member having a vertical portion and means for associating said vertical portion to said base member's second end, said vertical portion having upper and lower ends, and a length greater than that of each of the bicycles, said bicycles lacking a front wheel, said vertical portion extending upwardly from the second end of the base member; the improvement comprising:

a series of trays, each tray sized and shaped to receive a respective rear wheel of the bicycles, said trays being stacked one atop another and extending radially in different horizontal planes from said vertical portion proximate said vertical portion's lower end; and means for releasably securing the upper end of said vertical portion to the respective front ends of the bicycles.

* * * * *

UNITED STATES PATENT AND TRADEMARK OFFICE
CERTIFICATE OF CORRECTION

PATENT NO : 5,871,131
DATED : February 16, 1999
INVENTOR(S) : Low et al.

It is certified that error appears in the above-identified patent and that said Letters Patent are hereby corrected as shown below:

Column 2, line 28, change "is" to --are--;

Column 2, line 30, change "is" to --are--;

Column 5, line 54, change "a" (at beginning of line) to --an--;

Column 6, line 55, delete "In" and change "a" to --A--; and

Column 6, line 56, change "a" (first occurrence) to --an--.

Signed and Sealed this

Tenth Day of April, 2001

*Attest:*

NICHOLAS P. GODICI

*Attesting Officer*   *Acting Director of the United States Patent and Trademark Office*